(12) United States Patent
Kim et al.

(10) Patent No.: US 8,714,045 B2
(45) Date of Patent: May 6, 2014

(54) ROBOT JOINT DRIVING APPARATUS AND ROBOT HAVING THE SAME

(75) Inventors: Jeong Hun Kim, Suwon-si (KR); Young Bo Shim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 362 days.

(21) Appl. No.: 12/654,301

(22) Filed: Dec. 16, 2009

(65) Prior Publication Data
US 2010/0170357 A1    Jul. 8, 2010

(30) Foreign Application Priority Data
Jan. 8, 2009    (KR) .................. 10-2009-0001614

(51) Int. Cl.
*F16H 25/20*    (2006.01)
*B25J 18/00*    (2006.01)

(52) U.S. Cl.
USPC .................... 74/490.04; 74/89.23; 74/490.03; 901/21

(58) Field of Classification Search
USPC ................. 74/89.23, 490.03, 490.04, 490.05, 74/490.06; 901/21
See application file for complete search history.

(56) References Cited

U.S. PATENT DOCUMENTS

| | | | | | |
|---|---|---|---|---|---|
| 4,557,156 | A | * | 12/1985 | Teramachi | ................. 74/424.86 |
| 5,111,708 | A | * | 5/1992 | Brusasco | ..................... 74/89.23 |
| 6,053,064 | A | * | 4/2000 | Gowing et al. | .............. 74/89.45 |
| 6,155,376 | A | * | 12/2000 | Cheng | ........................... 180/444 |
| 7,574,939 | B2 | * | 8/2009 | Garrec | ........................ 74/490.03 |
| 2003/0074990 | A1 | * | 4/2003 | Garrec | ......................... 74/89.37 |

* cited by examiner

*Primary Examiner* — William C Joyce
(74) *Attorney, Agent, or Firm* — Staas & Halsey LLP (57) ABSTRACT

A robot joint driving apparatus and a robot having the same are capable of minimizing a load applied to a drive motor by rotating a ball nut part such that a ball screw part performs linear movement in a power transmission structure using a wire and the ball screw apparatus. The robot joint driving apparatus includes a reversible drive motor, a ball nut part rotated according to operation of the drive motor, a ball screw part performing linear movement according to rotation of the ball nut part, a wire connected to the ball screw part from both sides of the ball screw part, an idle pulley rotatably installed at one side of the wire, and a joint part rotatably installed at an opposite side of the wire.

13 Claims, 7 Drawing Sheets

ROBOT JOINT DRIVING APPARATUS AND ROBOT HAVING THE SAME

CROSS-REFERENCE TO RELATED APPLICATIONS

This application claims the benefit of Korean Patent Application No. 10-2009-0001614, filed on Jan. 8, 2009, in the Korean Intellectual Property Office, the disclosure of which is incorporated herein by reference.

BACKGROUND

1. Field

The present invention relates to a robot joint driving apparatus and a robot having the same. More particularly, the present invention relates to a robot joint driving apparatus provided with an improved joint driving structure and a robot having the same.

2. Description of the Related Art

Recently, various robots such as biped walking robots and quadruped walking robots have been developed for household, industrial and military use.

Such robots perform various actions in addition to running and walking using joints. The joints can be driven by using a motor and a reduction unit connected to the motor or by using a wire.

The joint driving scheme using the reduction unit has a limited arrangement of the driving apparatus, causes severe noise during operation and has low driving efficiency. In particular, the joint driving scheme has poor reverse-drivability, so that the robot-human interaction may not be effectively achieved.

A joint driving scheme using a wire has been recently introduced since the joint driving scheme using the wire can solve problems of the joint driving scheme using the reduction unit.

As one example of the joint driving scheme using the wire, an actuator having a structure similar to human muscles is used. In the joint driving scheme using the wire, the wire is wound around a pulley connected to the motor and is pulled such that a joint rotates, thereby operating a link connected to the joint.

SUMMARY

Accordingly, it is an aspect of the present invention to provide a robot joint driving apparatus having a structure to be easily controlled by using a wire, and a robot having the same.

It is another aspect of the present invention to provide a robot joint driving apparatus and a robot having the same, capable of minimizing the load applied to a drive motor by rotating a ball nut part such that a ball screw part performs linear movement in a power transmission structure using a wire and the ball screw apparatus.

Additional aspects and/or advantages of the invention will be set forth in part in the description which follows and, in part, will be apparent from the description, or may be learned by practice of the invention.

The foregoing and/or other aspects of the present invention are achieved by providing a robot joint driving apparatus. The robot joint driving apparatus includes a reversible drive motor, a ball nut part rotated according to an operation of the drive motor, a ball screw part performing linear movement according to the rotation of the ball nut part, a wire connected to first and second sides of the ball screw part, an idle pulley rotatably installed at a first side of the wire, and a joint part rotatably installed at a second side of the wire.

The robot joint driving apparatus further includes a guide member which allows the ball screw part to perform linear movement, and a support pin, which is restricted by the guide member such that the ball screw part operates together with the wire.

A linking part is coupled to one end of the ball screw part such that the ball screw part is connected to the wire, and the ball screw part and the linking part perform linear movement along the guide member.

Guide holes are formed at two symmetrical regions of the guide part along a movement direction of the ball screw part and the linking part such that repulsive force applied to the ball screw part is offset, and a support pin is inserted into the guide hole to couple the linking part to the wire.

The support pin is provided in the form of a roller so that the support pin slidably moves in the guide hole.

The ball nut part is screwed to a gear part engaged with the drive motor.

The ball nut part and the gear part are rotated according to the operation of the drive motor.

The ball nut part includes a first ball nut part screwed to the gear part and a second ball nut part screwed to the first ball nut part.

The foregoing and/or other aspects of the present invention are also achieved by providing a robot including a joint part and a joint driving apparatus to drive the joint part. The joint driving apparatus includes a reversible drive motor, a ball nut part rotated according to operation of the drive motor, a ball screw part performing linear movement according to the rotation of the ball nut part, a wire connected to the ball screw part from first and second sides of the ball screw part, and an idle pulley rotatably installed at a first side of the wire, and the joint part rotatably installed at a second side of the wire opposite the first side.

The robot further includes a guide member, which allows the ball screw part to perform linear movement in the guide member, and a support pin to restrict the ball screw part, which interacts with the wire, in the guide member.

The ball nut part is screwed to a gear part engaged with the drive motor and rotated according to operation of the drive motor.

The ball nut part includes a first ball nut part screwed to the gear part and a second ball nut part screwed to the first ball nut part.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to the like elements throughout. The embodiments are described below to explain the present invention by referring to the figures.

Although the following description will be made in relation to a humanoid robot, the embodiments of the present invention are applicable for various types of robots.

Figure 1:
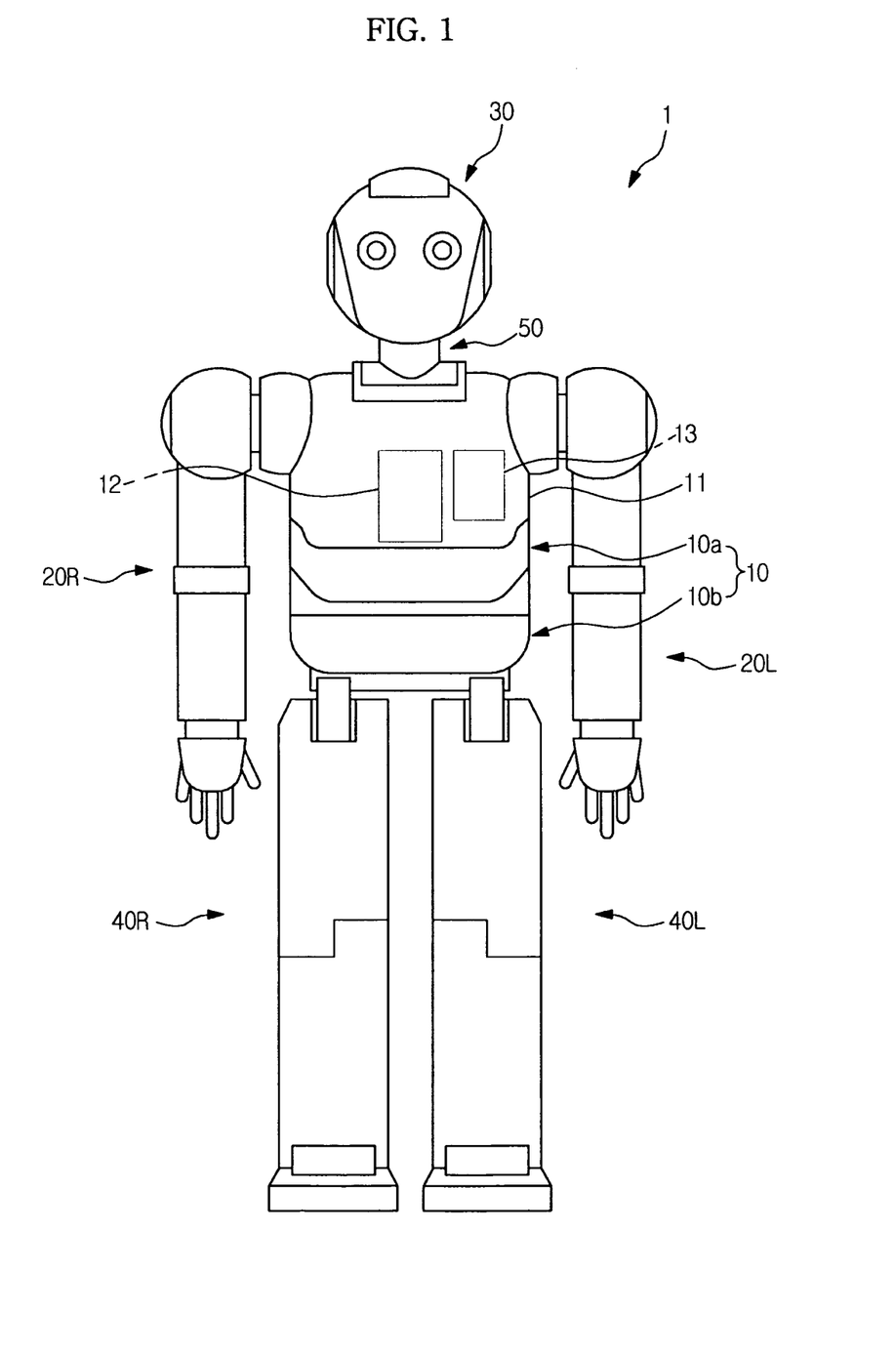
FIG. 1 is a view showing an external appearance of a humanoid robot according to an embodiment of the present invention.
Figure 2:
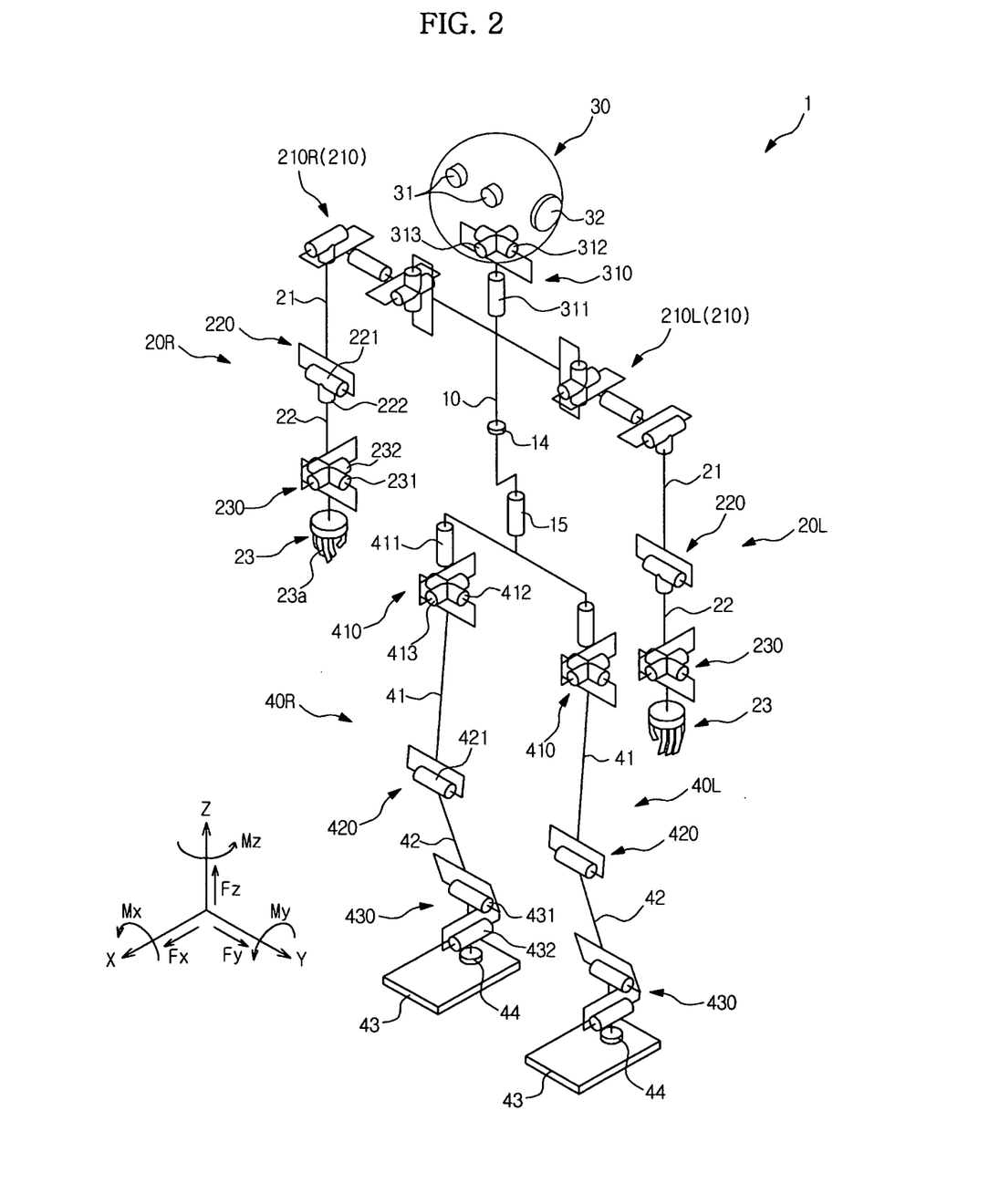
FIG. 2 is a view schematically showing a structure of the humanoid robot shown in FIG. 1.

FIG. 1 is a view showing an external appearance of a humanoid robot according to an embodiment of the present invention, and FIG. 2 is a view schematically showing a structure of the humanoid robot shown in FIG. 1.

As shown in FIGS. 1 and 2, a humanoid robot (hereinafter, simply referred to as a 'robot') 1 includes a central body 10, arms 20R and 20L connected to both upper sides of the central body 10, a head 30 connected to an upper end of the central body 10, and legs 40R and 40L connected to both lower sides of the central body 10. The arms 20R and 20L are connected to the central body 10 through shoulder joint assemblies 210R and 210L, and the head 30 is connected to the central body 10 through a neck 50. Reference numerals "R" and "L" represent a right side and a left side, respectively.

The interior of the central body 10 is protected by a cover 11. A control unit 12, a battery 13 and an inclination sensor 14 (see, FIG. 2) are installed in the central body 10. The inclination sensor 14 detects an inclination angle and an angular velocity of the central body 10 with respect to a vertical axis.

The central body 10 is divided into a chest part 10a and a waist part 10b. A joint 15 is installed between the chest part 10a and the waist part 10b such that the chest part 10a is rotatable relative to the waist part 10b. In FIG. 2, the central body 10 is briefly shown as a link.

The arms 20R and 20L are provided with upper arm links 21, lower arm links 22 and hands 23. The upper arm link 21 is connected to the central body 10 through the shoulder joint assembly 210. The upper arm link 21 and the lower arm link 22 are connected to each other through an elbow joint part 220, and the lower arm link 22 is connected to the hand 23 through a wrist joint part 230.

The elbow joint part 220 includes a pitch-direction rotation joint 221 and a yaw-direction rotation joint 222 and thus has two degrees of freedom. The wrist joint part 230 includes a pitch-direction rotation joint 231 and a roll-direction rotation joint 232 and thus has two degrees of freedom.

Five fingers 23a are installed on the hand 23. The fingers 23a are provided with a plurality of joints (not shown) driven by a motor. The finger 23a performs various actions, such as grabbing an object and pointing a specific direction in combination with the movement of the arms 20R and 20L.

The shoulder joint assemblies 210R and 210L are installed at both sides of the central body 10 to connect the arms 20R and 20L to the central body 10. The shoulder joint assemblies 210R and 210L are disposed between the central body 10 and the arms 20R and 20L of the robot 1 to move the arms 20R and 20L.

A camera 31 serving as an eye of the robot 1 and a microphone 32 serving as an ear of the robot 1 are installed on the head 30.

The head 30 is connected to the central body 10 through a neck joint part 310. The neck joint part 310 includes a yaw-direction rotation joint 311, a pitch-direction rotation joint 312 and a roll-direction rotation joint 313 and thus has three degrees of freedom.

Motors (not shown) to rotate the head 30 are connected to the rotation joints 311, 312 and 313 of the neck joint part 310. The control unit 12 controls the motors to drive the rotation joints 311, 312 and 313 at a predetermined angle, thereby moving the head 30 in a desired direction.

The legs 40R and 40L are provided with a thigh link 41, a lower leg link 42 and a foot 43. The thigh link 41 is connected to the central body 10 through a thigh joint part 410. The thigh link 41 and the lower leg link 42 are connected to each other through the knee joint part 420, and the lower leg link 42 is connected to the foot 43 through an ankle joint part 430.

The thigh joint part 410 has three degrees of freedom. In detail, the thigh joint part 410 includes a yaw-direction rotation joint 411 for rotation about a Z axis, a pitch-direction rotation joint 412 for rotation about a Y axis, and a roll-direction rotation joint 413 for rotation about an X axis.

The knee joint part 420 includes a pitch-direction rotation joint 421 and has one degree of freedom. The ankle joint part 430 includes a pitch-direction rotation joint 431 and a roll-direction rotation joint 432 and thus has two degrees of freedom.

As described above, the three joint parts of the legs 40R and 40L are provided with six rotation joints, so twelve joints are provided in the legs. Although not shown, motors to drive the rotation joints are installed on the legs 40R and 40L. The control unit 12 controls the motors provided on the legs 40R and 40L such that the legs 40R and 40L achieve various actions such as walking of the robot 1.

Meanwhile, a multi-axis force and torque sensor 44 is installed between the foot 43 and the ankle joint part 430 in the legs 40R and 40L. The multi-axis force and torque sensor 44 measures three directional components of force Fx, Fy and Fz and three directional components of moment Mx, My and Mz transferred from the foot 43, thereby detecting whether the foot 43 is grounded and detecting the load applied to the foot 43.

Such a robot 1 is provided with a joint driving apparatus 500 to drive the joints. Although the joint driving apparatus can be applied to various joints of the arms, the legs and the neck, the following description will be made in relation to the joint driving apparatus 500 applied to the knee joint part and the ankle joint part of the legs.

Figure 3:
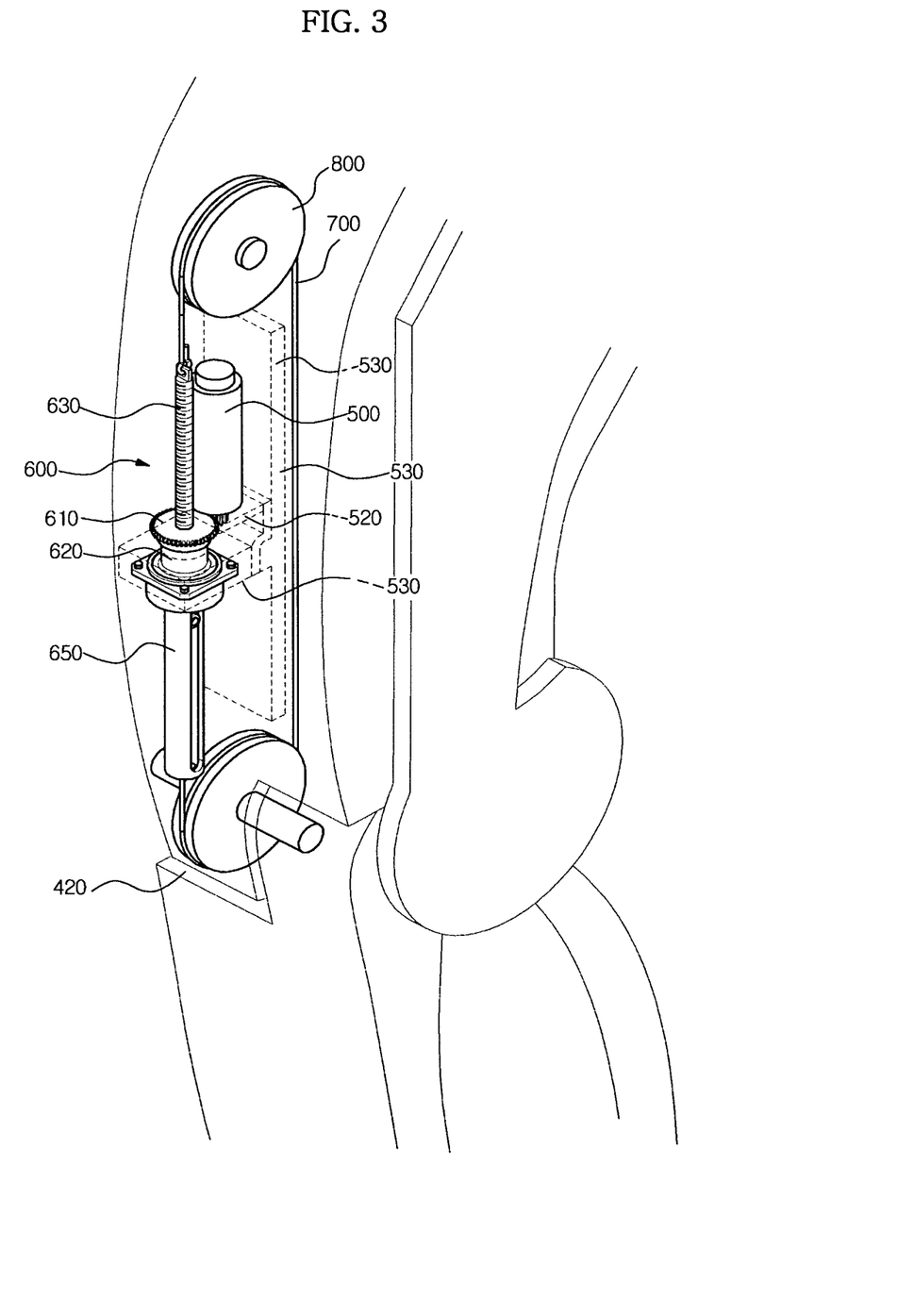
FIG. 3 is a perspective view showing a knee joint driving apparatus according to the embodiment of the present invention.
Figure 4:
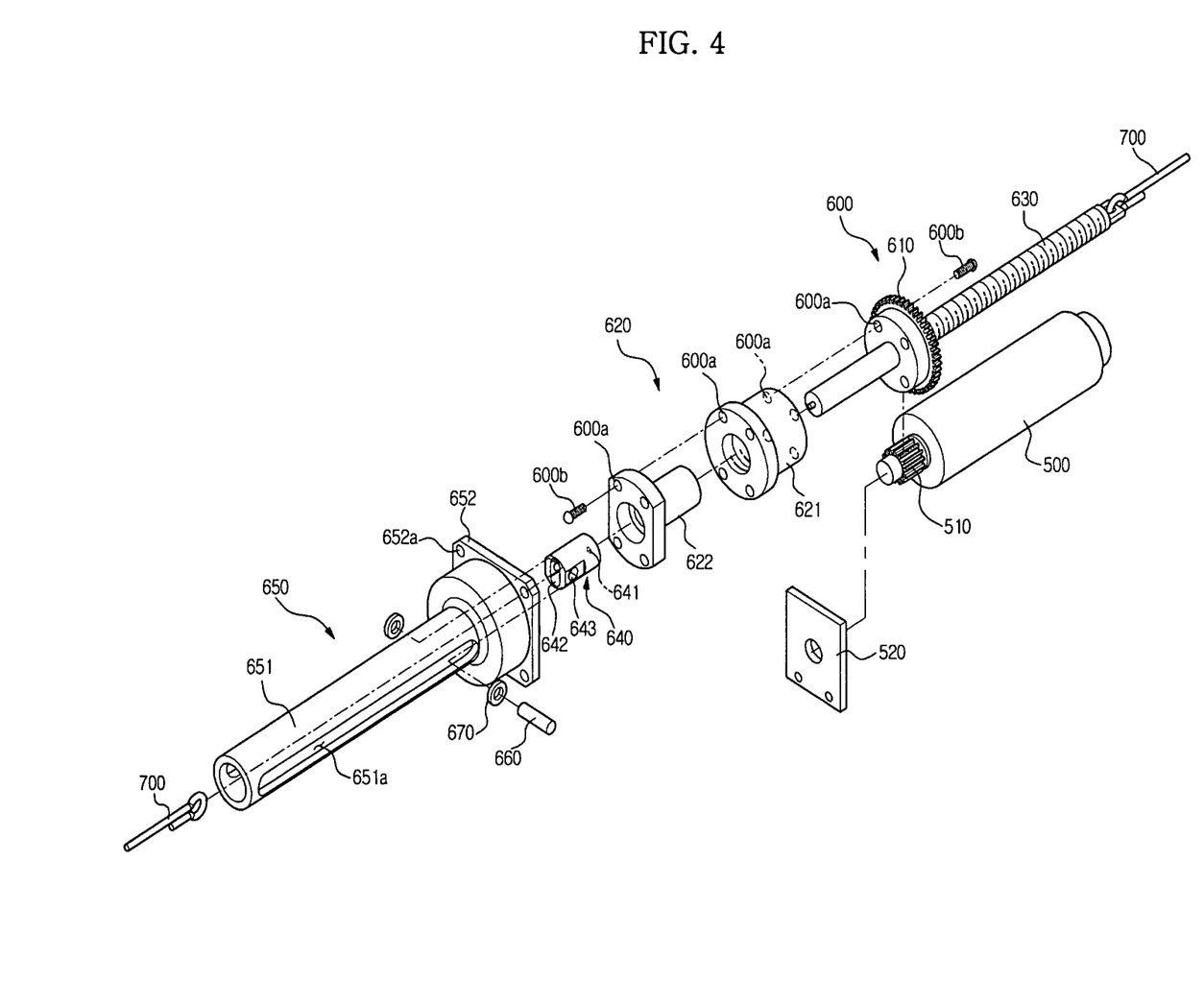
FIG. 4 is an exploded perspective view showing the knee joint driving apparatus shown in FIG. 3.
Figure 5:
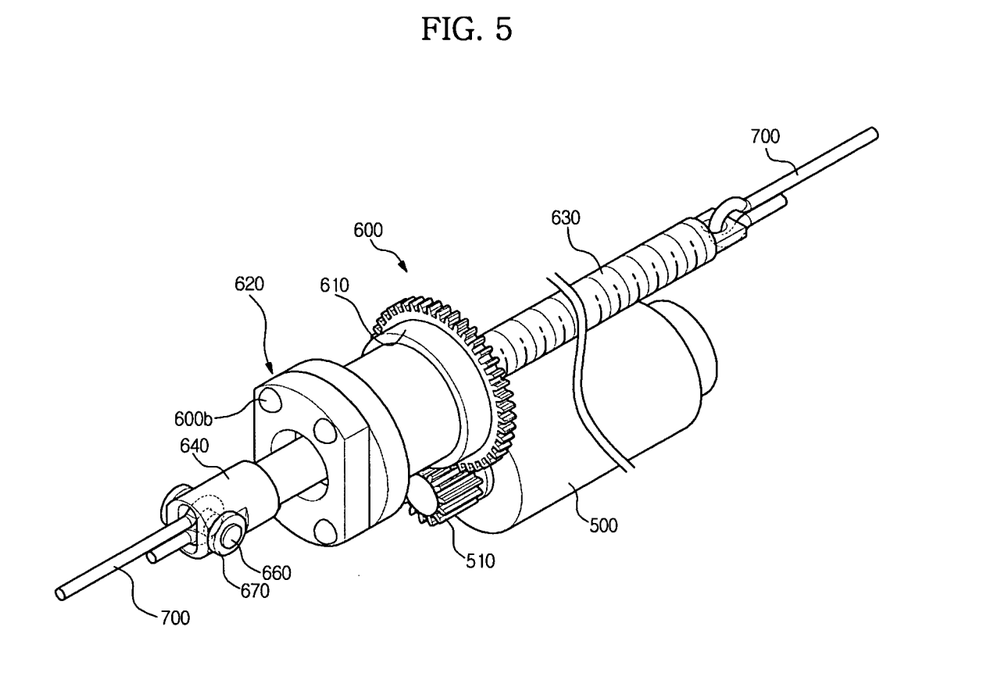
FIG. 5 is a perspective view showing a part of the knee joint driving apparatus shown in FIG. 3.

FIG. 3 is a perspective view showing the knee joint driving apparatus according to the embodiment of the present invention, FIG. 4 is an exploded perspective view showing the knee joint driving apparatus shown in FIG. 3, and FIG. 5 is a perspective view showing a part of the knee joint driving apparatus shown in FIG. 3.

As shown in FIGS. 3 to 5, the joint driving apparatus according to the embodiment of the present invention includes a reversible drive motor 500, a ball screw apparatus 600 having a ball screw part 630, which is coupled to the drive motor 500 to perform linear movement according to operation of the drive motor 500, a wire 700 connected to the ball screw part 630 from both sides of the ball screw part 630, an idle pulley 800 rotatably installed at one side of the wire 700 and the knee joint part 420 rotatably installed at an opposite side of the wire 700.

The drive motor 500 is driven forward and backward, and is provided with a motor gear 510. The drive motor 500 is installed on a motor bracket 520 and is fixed to a fixing plate 530. A gear part 610 is engaged with the motor gear 510 to receive driving force of the drive motor 500.

The ball screw apparatus 600 according to the embodiment of the present invention is provided with the ball screw part 630 which is connected to the gear part 610 to perform linear movement when the drive motor 500 is driven forward or backward.

In the ball screw apparatus 600 according to the embodiment of the present invention, the ball screw part 630 having low inertia performs linear movement, thereby minimizing load applied to the drive motor 500 when the joint is suddenly operated or stopped.

The ball screw apparatus 600 includes the gear part 610 to receive the driving force of the drive motor 500, a ball nut part 620, which is connected to the gear part 610 and is provided at an inner surface thereof with a screw part, and the ball screw part 630 performing linear movement according to rotation of the ball nut part 620.

The ball nut part 620 is provided in a substantially cylindrical shape. The ball nut part 620 includes a first ball nut part 621 screwed to the gear part 610 and a second ball nut part 622 screwed to the first ball nut part 621. The first ball nut part 621 and the second ball nut part 622 are screwed to the gear part 610 and the first ball nut part 621, respectively, through a fixing hole 600a. The first ball nut part 621 allows the second ball nut part 622 to be easily coupled to the gear part 610. Accordingly, the first ball nut part 621 and the second ball nut part 622 can be integrally screwed to the gear part 610.

The gear part 610 and the first and second ball nut parts 621 and 622 rotate according to operation of the drive motor 500. Since the position of the first and second ball nut parts 621 and 622 is fixed at one side of the ball screw part 630, the first and second ball nut parts 621 and 622 rotate without performing linear movement. Accordingly, rotational movement of the ball nut part 620 can be efficiently converted into linear movement of the ball screw part 630.

The ball screw part 630 is provided at an outer surface thereof with a screw part coupled to the screw part formed on the inner surface of the ball nut part 620. The ball screw part 630 is connected to both sides of the wire 700, in which one end of the ball screw part 630 is directly connected to the wire 700 and an opposite end of the ball screw part 630 is connected to the wire 700 through a linking part 640. The linking part 640 is formed therein with a coupling groove 641 coupled with the ball screw part 630, an insertion groove 642 into which the wire 700 is inserted and a through hole 643 to fix the wire 700 inserted into the insertion groove 642.

A guide member 650 is provided at one side of the ball screw apparatus 600 to allow the ball screw part 630 to perform linear movement. The guide member 650 includes a guide part 651 provided in a cylindrical shape having a predetermined width and length and a connection part 652 connecting the guide part 651. Two guide holes 651a are formed at both sides of the guide part 651 lengthwise along the guide part 651. A support pin 660 is inserted into the guide hole 651a. The support pin 660 is inserted into the through hole 643 of the linking part 640 in a state that the support pin 660 is connected to a bearing 670 through the guide holes 651a. Accordingly, if the ball screw part 630 linearly moves, the bearing 670 slidably moves, and the support pin 660 linearly moves along the guide hole 651a.

That is, the ball screw part 630 is supported by the bearing 670 at the guide holes, so that the ball screw part 630 is prevented from rotating. Therefore, repulsive force is supported at the guide holes 651a, thereby reducing the load applied to the ball screw part 630.

Reference numeral 652a refers to a fixing hole used to screw the guide member 650 to the fixing plate 530.

The wire 700 is connected to the ball screw part 630 from the both sides of the ball screw part 630. Accordingly, pretension is applied to the ball screw part 630 from the both sides of the ball screw part 630, so that repulsive force between the ball screw part 630 and the ball nut part 620 is minimized, thereby reducing load applied to the drive motor 500.

In addition, the wire 700 is connected to the idle pulley 800 and the knee joint part 420 such that the knee joint part 420 is rotated through the driving force of the drive motor 500. The idle pulley 800 pulls the wire 700 from both sides of the wire 700, thereby reducing load applied to the ball screw part 420. The wire 700 includes steel, and surrounds the idle pulley 800 having a disk shape and the knee joint part 420.

Hereinafter, an operation of the knee joint driving apparatus according to the embodiment of the present invention will be described with reference to FIGS. 6 and 7.

Figure 6:
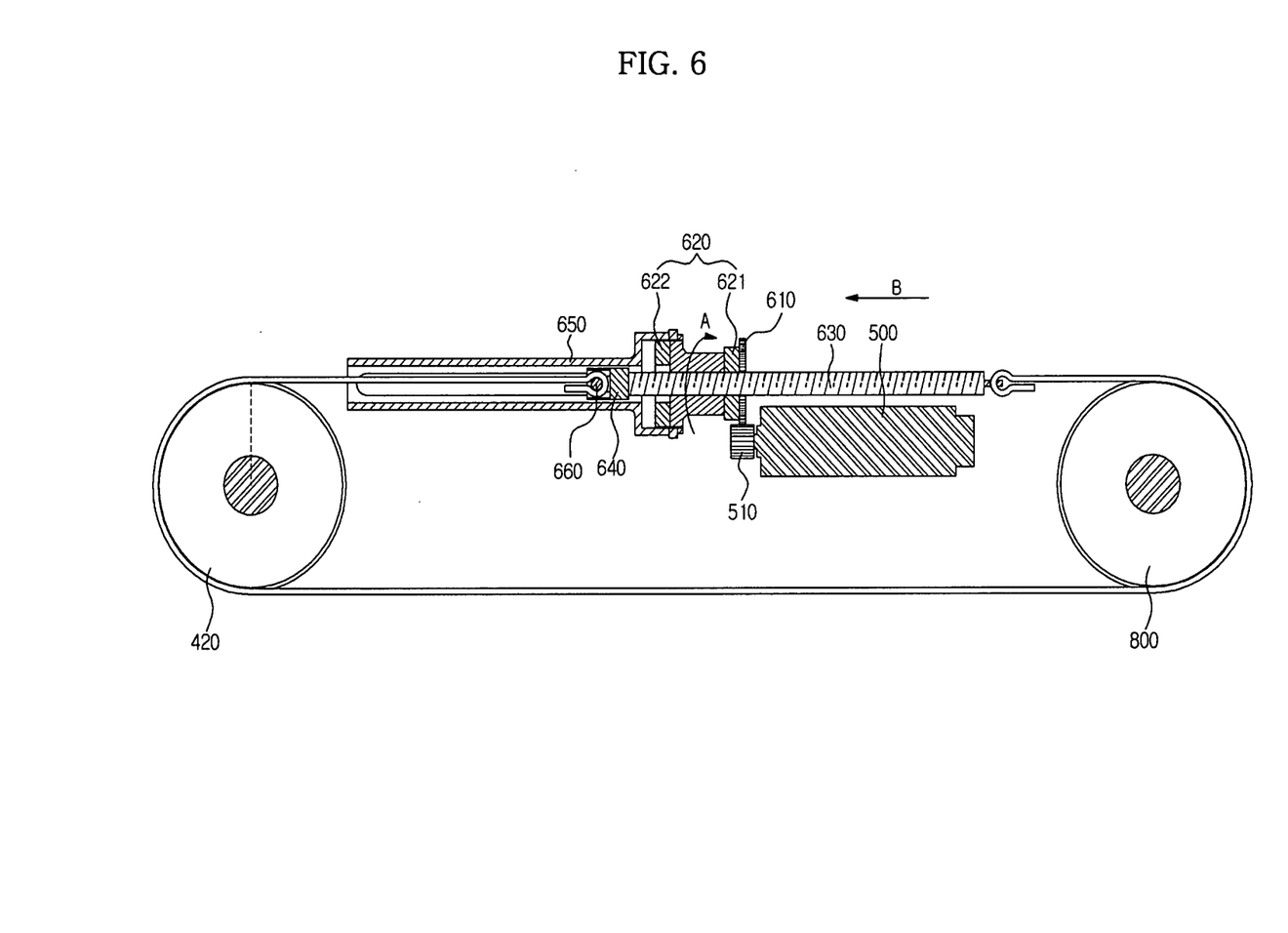
FIGS. 6 and 7 are views showing an operation of the knee joint driving apparatus according to the embodiment of the present invention.
Figure 7:
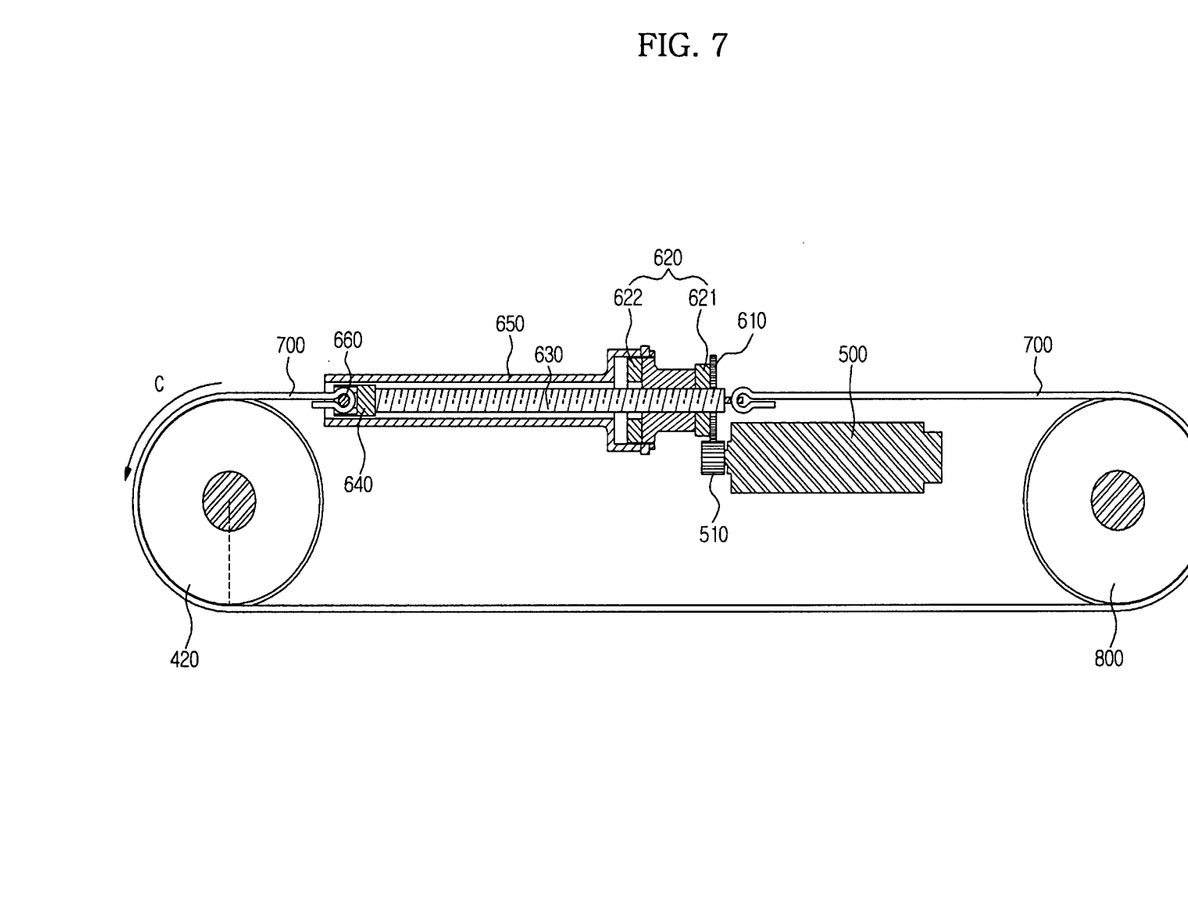

As shown in FIGS. 6 and 7, if the drive motor 500 operates forward, the ball nut part 620 rotates in an A direction and the ball screw part 630 moves in a B direction according to rotation of the ball nut part 620. The wire 700 fixed to the both ends of the ball screw part 620 linearly moves according to movement of the ball screw part 630, so that the idle pulley 800 and the knee joint part 420 rotate in a C direction.

In addition, if the drive motor 500 operates backward, the ball nut part 620 rotates in a direction opposite to the A direction, and the ball screw part 630 connected to the ball nut part 620 and the wire 700 move in a direction opposite to the B direction, so that the idle pulley 800 and the knee joint part 420 rotate in a direction opposite to the C direction.

The ball screw part 630 is guided by the guide member 650 connected to an end of the ball screw part 630, so the ball screw part 630 performs linear movement without rotation when the drive motor 500 operates.

At the same time, the ball screw part 630 is supported by the bearing 670 from both directions of the ball screw part, so that repulsive force transferred from the ball nut part 620 to the ball screw part 630 is removed, thereby removing friction which occurs between the ball nut part 620 and the ball screw part 630 and exerts an influence on operation of the ball screw apparatus 600. Therefore, the performance of the knee joint apparatus can be improved.

According to the robot joint driving apparatus of the embodiment of the present invention, the joint parts coupled to the wire can be stably rotated using one drive motor. In addition, the ball screw part having low inertia performs linear movement, thereby reducing load which is applied to the drive motor when the joints are suddenly operated or stopped.

The joint driving apparatus according to the embodiment of the present invention and the robot having the same can easily control the joints using the wire. In addition, even when the joints suddenly operate, load applied to the motor can be minimized by operating the ball screw part having low inertia.

Although few embodiments of the present invention have been shown and described, it would be appreciated by those skilled in the art that changes may be made in these embodiments without departing from the principles and sprit of the invention, the scope of which is defined in the claims and their equivalents.

What is claimed is:
1. A robot joint driving apparatus comprising:
   a reversible drive motor;
   a motor gear disposed on an end portion of the reversible drive motor, rotated according to an operation of the drive motor;

a ball nut part rotated according to an operation of the drive motor;
a gear part, directly connected to the ball nut part and directly engaged with the motor gear through physical contact with the motor gear;
a ball screw part performing linear movement according to the rotation of the ball nut part;
a wire connected to the ball screw part at first and second sides of the ball screw part;
an idle pulley rotatably installed at a first side of the wire; and
a joint part rotatably installed at a second side of the wire opposite the first side,
wherein the ball nut part includes a first ball nut part screwed to the gear part and a second ball nut part screwed to the first ball nut part,
wherein the second ball nut part includes a cylindrical body protruding from an inner surface of the second ball nut part, which is inserted into a hollow portion of the first ball nut part.

2. The robot joint driving apparatus of claim 1, further comprising a guide member which allows the ball screw part to perform the linear movement, and a support pin, which is restricted by the guide member such that the ball screw part operates together with the wire.

3. The robot joint driving apparatus of claim 2, further comprising:
a linking part coupled to an end of the ball screw part such that the ball screw part is connected to the wire, and the ball screw part and the linking part perform linear movement along the guide member.

4. The robot joint driving apparatus of claim 2, wherein the reversible drive motor is installed on a motor bracket, and the motor bracket is fixed to a fixing plate.

5. The robot joint driving apparatus of claim 4, wherein the guide member includes:
a guide part which includes a plurality of guide holes into which the support pin is inserted; and
a connection part to connect the guide member to the fixing plate.

6. The robot joint driving apparatus of claim 1, wherein the ball nut part and the gear part are rotated according to the operation of the drive motor.

7. A robot joint driving apparatus comprising:
a reversible drive motor;
a motor gear disposed on an end portion of the reversible drive motor, rotated according to an operation of the drive motor;
a ball nut part rotated according to an operation of the drive motor;
a gear part, directly connected to the ball nut part and directly engaged with the motor gear through physical contact with the motor gear;
a ball screw part performing linear movement according to the rotation of the ball nut part;
a wire connected to the ball screw part at first and second sides of the ball screw part;
an idle pulley rotatably installed at a first side of the wire;
a joint part rotatably installed at a second side of the wire opposite the first side; a guide member which allows the ball screw part to perform the linear movement, and a support pin, which is restricted by the guide member such that the ball screw part operates together with the wire;
a linking part coupled to an end of the ball screw part such that the ball screw part is connected to the wire, and the ball screw part and the linking part perform linear movement along the guide member;
a plurality of guide holes formed at two symmetrical regions of the guide part along a movement direction of the ball screw part and the linking part such that a repulsive force applied to the ball screw part is offset; and
the support pin is inserted into the guide hole to couple the linking part to the wire.

8. The robot joint driving apparatus of claim 7, wherein the support pin is a roller so that the support pin slidably moves in the guide hole.

9. A robot comprising:
a joint part; and
a joint driving apparatus to drive the joint part,
wherein the joint driving apparatus comprises:
a reversible drive motor;
a motor gear disposed on an end portion of the reversible drive motor, rotated according to an operation of the drive motor;
a ball nut part rotated according to operation of the drive motor;
a gear part, directly connected to the ball nut part and directly engaged with the motor gear through physical contact with the motor gear;
a ball screw part performing linear movement according to the rotation of the ball nut part;
a wire connected to the ball screw part from first and second sides of the ball screw part; and
an idle pulley rotatably installed at a first side of the wire, the joint part being rotatably installed at a second side of the wire opposite the first side,
wherein the ball nut part includes a first ball nut part screwed to the gear part and a second ball nut part screwed to the first ball nut part,
wherein the second ball nut part includes a cylindrical body protruding from an inner surface of the second ball nut part, which is inserted into a hollow portion of the first ball nut part.

10. The robot of claim 9, further comprising a guide member which allows the ball screw part to perform linear movement in the guide member, and a support pin to restrict the ball screw part, which interacts with the wire, in the guide member.

11. The robot of claim 10, wherein the reversible drive motor is installed on a motor bracket, and the motor bracket is fixed to a fixing plate.

12. The robot of claim 11, wherein the guide member includes:
a guide part which includes a plurality of guide holes into which the support pin is inserted; and
a connection part to connect the guide member to the fixing plate.

13. The robot of claim 9, wherein the ball nut part and the gear part are rotated according to the operation of the drive motor.

* * * * *